Oct. 26, 1954

D. A. WRIGHT 2,692,959

GAS FILLED THERMIONIC VALVE

Filed March 4, 1950

DONALD ARTHUR WRIGHT
Inventor

Patented Oct. 26, 1954

2,692,959

UNITED STATES PATENT OFFICE 2,692,959

GAS FILLED THERMIONIC VALVE

Donald Arthur Wright, Harrow, England, assignor to The M-O Valve Company Limited, London, England Application March 4, 1950, Serial No. 147,657

Claims priority, application Great Britain March 10, 1949

5 Claims. (Cl. 313—175)

The present invention relates to gas-filled thermionic valves; the invention particularly relates to such valves of the kind in which part at least of the gaseous filling is hydrogen.

One example of such a valve is a gas-filled electronic relay comprising a cathode, a control electrode and an anode contained in a sealed envelope provided with a hydrogen filling. A common cause of failure in the operation of hydrogen-filled electronic relays is the reduction of the pressure of the filling due to "cleanup" of the hydrogen on the walls and electrodes of the device, which below a certain pressure results in an increase in the potential difference between the cathode and the anode for a given discharge current. This increased potential difference may itself result in failure to operate, or the resultant increased temperature of the anode which results may cause the liberation of gases from the anode which poison the cathode.

One object of the present invention is to provide a thermionic valve of the kind specified in which operation is improved and the useful life is increased as compared with known valves of this kind.

In accordance with the present invention there is provided a gas filled thermionic valve comprising a sealed envelope provided with a gaseous filling part at least of which is hydrogen, at least a cathode and an anode mounted within the sealed envelope, a sealed container having a wall at least a portion of which consists of a material that is permeable to hydrogen to an appreciable degree only over a predetermined range of temperatures, said container being mounted within the sealed envelope in a position such that the temperature of the container during operation of the valve varies in the same sense as the temperature of the anode and under normal operating conditions of the valve is below the lower limit of said predetermined range of temperatures, and a source of hydrogen disposed in said container, said source being such that free hydrogen is present in the container over at least the lower part of said range of temperatures, at least said lower limit of said temperature range being attained by said container when the temperature of the anode rises over a period of time due to hydrogen clean-up.

Preferably the source of hydrogen is a chemical compound of hydrogen which is decomposable on heating with consequent evolution of hydrogen over at least the lower part of said range of temperatures; said container is secured to the anode in good thermal contact therewith.

The chemical compound may, for example, be the hydride of zirconium, titanium, tantalum, vanadium or thorium and the container may, for example be at least partially of nickel, copper, iron or palladium.

The invention will be further described with reference to the accompanying drawings, in which.

Figure 1:
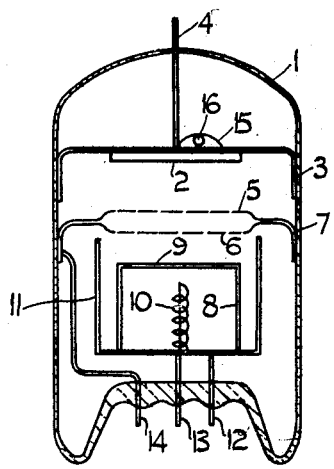
Figure 1 is a diagrammatic representation of a hydrogen-filled electronic relay in accordance with the invention.
Figure 2:
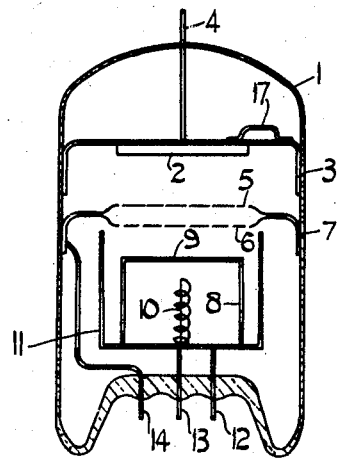
Figure 2 is a diagrammatic representation of a hydrogen-filled electronic relay in accordance with the invention and of alternative construction to that shown in Figure 1.

In each of the embodiments of the invention shown in Figures 1 and 2 of the drawings the electronic relay has a sealed glass envelope 1 provided with a hydrogen filling. The anode consists of a molybdenum plate 2 attached to the inside of a nickel cup 3 which has a diameter slightly less than that of the envelope 1, the size of the plate 2 being such that substantially the whole of the electrons in the discharge strike the plate 2 and not the cup 3. The anode is supported by a lead-in wire 4 sealed through the envelope 1. The control grid of the relay consists of two perforated metal plates 5 and 6 supported by a second cup 7 which is of the same diameter as the cup 3, the holes in the plates 5 and 6 being staggered so that the discharge follows zig-zag paths. The cathode 8 is in the form of a circular cylindrical cup, the end face 9 of which is coated with a suitable emissive oxide coating, and is provided with a heater 10, one end of which is connected to the cathode 8. The cathode 8 is also provided with a circular cylindrical heat shield 11, which is electrically connected to the cathode 8 and extends into the space between the cathode 8 and the grid support cup 7. Lead in wires 12, 13 and 14 are sealed through the base of the envelope 1 for making electrical connection to the cathode 8, heater 10 and the control grid respectively.

Referring now to Figure 1, there is shown in this figure the preferred form of construction in accordance with the invention. The nickel cup 3 has a recess 15 formed in its base and in this recess 15 is disposed a sealed nickel tube 16 containing zirconium hydride.

An alternative form of construction is shown in Figure 2. In this case a small nickel cup 17 is secured to the base of the cup 3, the space contained by the cups 17 and 3 being filled with zirconium hydride. This form of construction will generally entail more inconvenience in manufacture and in processing the anode before assembly of the electrode structure of the electronic relay than will the construction illustrated in Figure 1.

Figure 3:
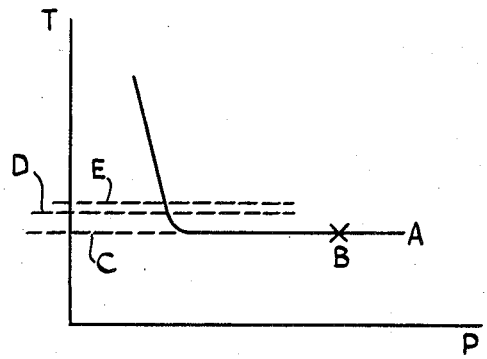
Figure 3 is a diagram explaining the operation of the devices illustrated in Figures 1 and 2.

The operation of the two valves illustrated in Figures 1 and 2 is essentially the same, and will now be described with reference to Figure 3 of the drawings in which the temperature T of the anode for a given discharge current is plotted as ordinate against the pressure P of the hydrogen filling as abscissa. The curve A shown in Figure 3 represents the operational relationship between T and P. The initial conditions of operation are represented by the point B on the curve A and are such that the temperature T of the anode, represented by the line C in Figure 3, is below 250 degrees centigrade. During further operation of the device the hydrogen pressure P will fall, due for example to "clean-up" and the operating point will move from the point B to the left along the curve A until it reaches the intersection of the curve A with the line D, which represents a temperature of approximately 350 degrees centigrade. At this point considerable evolution of hydrogen from the zirconium hydride in the nickel container will begin. The evolution of hydrogen due to decomposition of zirconium hydride on heating is considerable over a range of temperatures from 350 to 650 degrees centigrade, and although less above this range may not be complete until a temperature of about 900 degrees centigrade is reached. At a slightly higher temperature than 350 degrees centigrade, represented by the line E, the walls of the nickel container constituted in the respective embodiments of the invention described above by the tube 16 or the cup 17 and part of the cup 3, become permeable to hydrogen to an appreciable degree. This results in an increase of the pressure P of the hydrogen filling, and the operating point moves back to the right along the curve A. This results in a drop in the temperature T of the anode, but no appreciable re-absorption of the hydrogen evolved from the zirconium hydride occurs since the nickel container is not permeable to hydrogen to any appreciable degree below the temperature represented by the line E. A new equilibrium is therefore established with a comparatively short time lag and the operating point returns to a position on the curve A in the region of the intersection between the curve A and the line C. With further "clean-up" of the hydrogen filling the process will be repeated periodically until such time as the reserve supply of hydrogen, constituted by the zirconium hydride not yet decomposed, is exhausted. The hydrogen pressure P will then continue to fall until the valve ceases to function.

It will be appreciated that without the provision of a device such as the nickel container, the partially decomposed zirconium hydride would absorb hydrogen when it cooled during a period of non-operation, and the hydrogen pressure P would be reduced when it was desired to recommence operation. Failure of the valve due to reduced hydrogen pressure would then occur when there was still a supply of hydrogen available in the form of the zirconium hydride.

In the manufacture of the valves the nickel container is filled with zirconium hydride, is preferably evacuated, is sealed, and, in the case where the container is not partly constituted by the anode, is then secured in position on the anode. The use of a tubular construction for the nickel container is convenient since the container may be sealed after evacuation by a cold welding process similar to that which may be used in sealing off a thermionic valve having a metal pumping stem. The electrode structure of the device is assembled in the normal manner and after the usual outgassing process the envelope 1 is filled with hydrogen to the desired initial pressure.

The invention has been specifically described above with reference to two embodiments concerned with gas-filled electronic relays. It will be readily appreciated that the invention is equally applicable to other forms of gas-filled thermionic valve in which the gaseous filling is at least partially of hydrogen. In the case of a hydrogen filled diode, for example, the construction, manufacture, and operation of the valve would be substantially the same as those described above with reference to electronic relays, with the exception that in this case the grid electrode would be omitted.

It will be appreciated that in a thermionic valve according to the present invention the chemical compound of hydrogen serves as a reservoir of hydrogen which automatically provides hydrogen to replenish that which has been "cleaned-up" and the life of a valve according to the present invention is thereby prolonged over the life of valves not provided with means for hydrogen replenishment.

Although zirconium hydride has been referred to in the above described specific embodiments of the invention, it is to be understood that other chemical compounds of hydrogen may be used, such as the hydrides of titanium, tantalum, vanadium, and thorium, the choice of compound to be used being dependent upon the temperature range over which appreciable hydrogen evolution is required, which will in turn be determined by the operating conditions of the particular valve concerned. Similarly the container in which the chosen chemical compound is disposed may be of a metal other than nickel, for example copper, iron or palladium, provided that the metal is impermeable to hydrogen at temperatures at which occurs appreciable absorption by the particular chemical compound used. Part only of the container need be of a material which is permeable to hydrogen at the appropriate temperature. Although in the above described embodiments hydrogen was the sole constituent of the gaseous filling of the valve, it will be understood that the invention is also applicable where hydrogen constitutes only part of the gaseous filling.

I claim:

1. A gas filled thermionic valve comprising a sealed envelope provided with a gaseous filling part at least of which is hydrogen, at least a cathode and an anode mounted within the sealed envelope, a sealed container having a wall at least a portion of which consists of a material that is permeable to hydrogen to an appreciable degree only over a predetermined range of temperatures, said container being mounted within the sealed envelope in a position such that the temperature of the container during operation of the valve varies in the same sense as the temperature of the anode and under normal operating conditions of the valve is below the lower limit of said predetermined range of temperatures, and a source of hydrogen disposed in said container, said source being such that free hydrogen is present in the container over at least the lower part of said range of temperatures, at least said lower limit of said temperature range being attained by said container when the temperature of the anode rises over a period of time due to hydrogen clean-up.

2. A gas filled thermionic valve according to claim 1, in which said source of hydrogen comprises a chemical compound of hydrogen which is decomposable on heating with consequent evolution of hydrogen over at least the lower part of said range of temperatures.

3. A gas filled thermionic valve according to claim 2, in which said container is initially evacuated.

4. A gas filled thermionic valve according to claim 1 in which the container is secured to the anode in good thermal contact therewith.

5. A gas filled thermionic valve according to claim 1 in which part of said container is constituted by part of the anode.

References Cited in the file of this patent

UNITED STATES PATENTS

| Number | Name | Date |
|---|---|---|
| 1,096,390 | Regaud | May 12, 1914 |
| 1,716,159 | Widell | June 4, 1929 |
| 1,855,901 | Bareiss | Apr. 26, 1932 |
| 1,878,341 | Spencer | Sept. 20, 1932 |
| 2,497,911 | Reilly et al. | Feb. 21, 1950 |
| 2,582,282 | Rothstein | Jan. 15, 1952 |

OTHER REFERENCES

Jossem: "Admission of Pure Gases to Vacuum System," Review of Scientific Instruments, vol. 11, May 1940, pages 164 to 166, U. S. Patent Office Technical Library Q 184.R5.